United States Patent
Zaitsau

(10) Patent No.: US 11,520,507 B1
(45) Date of Patent: Dec. 6, 2022

(54) SYSTEM AND METHOD FOR TEST PRECONDITION GENERATION BASED ON FACTORY-FORMATTED STATE OF MEMORY DEVICE

(71) Applicant: SK hynix Inc., Gyeonggi-do (KR)

(72) Inventor: Yahor Zaitsau, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/406,860

(22) Filed: Aug. 19, 2021

(51) Int. Cl.
*G06F 3/06* (2006.01)

(52) U.S. Cl.
CPC ............ *G06F 3/0632* (2013.01); *G06F 3/064* (2013.01); *G06F 3/0605* (2013.01); *G06F 3/0619* (2013.01); *G06F 3/0659* (2013.01); *G06F 3/0673* (2013.01)

(58) Field of Classification Search
CPC .... G06F 3/0632; G06F 3/0605; G06F 3/0619; G06F 3/064; G06F 3/0659; G06F 3/0673
See application file for complete search history.

(56) References Cited

U.S. PATENT DOCUMENTS

| | | | |
|---|---|---|---|
| 7,680,632 B1 | 3/2010 | Aldrich | |
| 8,239,618 B2 | 8/2012 | Kotzur et al. | |
| 10,997,068 B1* | 5/2021 | Ebsen | G11C 16/0483 |
| 2011/0296079 A1* | 12/2011 | Kotzur | G06F 12/0246 |
| | | | 711/E12.001 |
| 2014/0108703 A1* | 4/2014 | Cohen | G06F 3/0655 |
| | | | 711/E12.008 |
| 2020/0089598 A1* | 3/2020 | Badrou | G05B 23/0256 |
| 2020/0234783 A1* | 7/2020 | Griffin | G11C 29/04 |

* cited by examiner

*Primary Examiner* — Francisco A Grullon
(74) *Attorney, Agent, or Firm* — IP & T Group LLP

(57) ABSTRACT

A system and associated method for generating a test precondition. The system includes a test device and a storage device including user data blocks and system blocks. The test device reads, from the system blocks, an initial system data snapshot stored and represents a factory format; erases the system blocks and the user data blocks; writes data to selected user data blocks; generates system tables associated with the erasing and writing of the selected user data blocks; replaces the initial system data snapshot with the system tables; writes the replaced system tables to the system blocks; and performs one or more tests on the storage device.

20 Claims, 7 Drawing Sheets

SYSTEM AND METHOD FOR TEST PRECONDITION GENERATION BASED ON FACTORY-FORMATTED STATE OF MEMORY DEVICE

BACKGROUND

1. Field

Embodiments of the present disclosure relate to a test system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having a memory device(s), that is, a data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may be tested using various test tools.

SUMMARY

Aspects of the present invention include a system and a method for generating a test precondition based on a factory-formatted state of a data storage device.

In one aspect of the present invention, a test system includes a test device and a storage device including a plurality of system blocks and a plurality of user data blocks, the system blocks configured to store an initial system data snapshot. The test device is configured to: read the initial system data snapshot from the system blocks of the storage device, in which the initial system data snapshot is stored and represents a factory format of the storage device; erase the system blocks and the user data blocks; writing data to one or more user data blocks selected from among the user data blocks based on a set precondition such that the storage device is preconditioned; generate one or more system tables associated with the erasing and writing of the selected user data blocks; replace the initial system data snapshot with the system tables associated with the erasing and writing of the selected user data blocks; write the replaced system tables to the system blocks; and perform one or more tests on the preconditioned storage device to determine if errors exist at least in writing the data to the storage device.

In another aspect of the present invention, a method for testing a storage device including a plurality of system blocks and a plurality of user data blocks, the system blocks storing an initial system data snapshot, includes: reading the initial system data snapshot from the system blocks of the storage device, in which the initial system data snapshot is stored and represents a factory format of the storage device; erasing the system blocks and the user data blocks; writing data to one or more user data blocks selected from among the user data blocks based on a set precondition such that the storage device is preconditioned; generating one or more system tables associated with the erasing and writing of the selected user data blocks; replacing the initial system data snapshot with the system tables associated with the erasing and writing of the selected user data blocks; writing the replaced system tables to the system blocks; and performing one or more tests on the preconditioned storage device to determine if errors exist at least in writing the data to the storage device.

Additional aspects of the present invention will become apparent from the following description.

DETAILED DESCRIPTION

Figure 1:
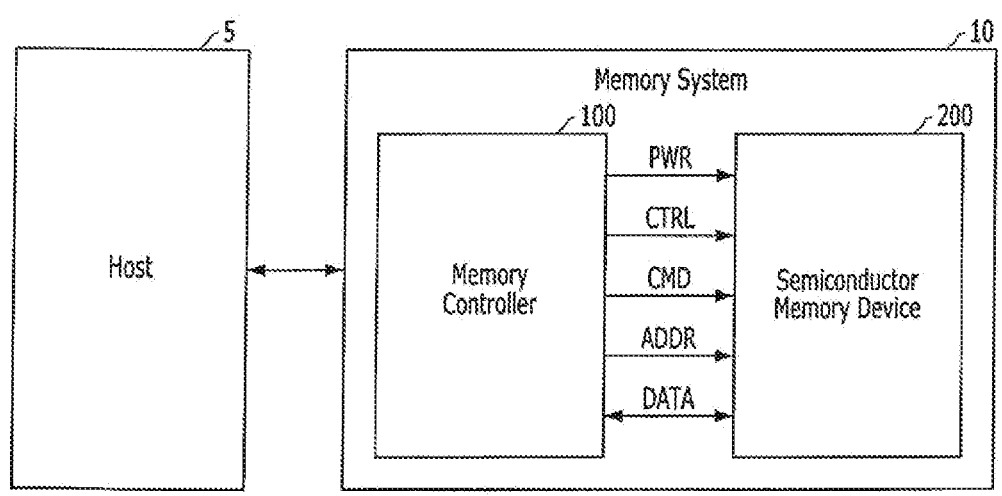
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or circuit component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing methods herein.

If implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of embodiments of the present invention is provided below along with accompanying figures that illustrate aspects of the present invention. The present invention is described in connection with such embodiments, but the present invention is not limited to any specific embodiment. The present invention encompasses numerous alternatives, modifications and equivalents. Numerous specific details are set forth in the following description in order to provide a thorough understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may be an electronic device such as for example a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may be a portable electronic device such as for example a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive through input/output lines a command CMD, an address ADDR, and data DATA. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. In one embodiment of the invention, where the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
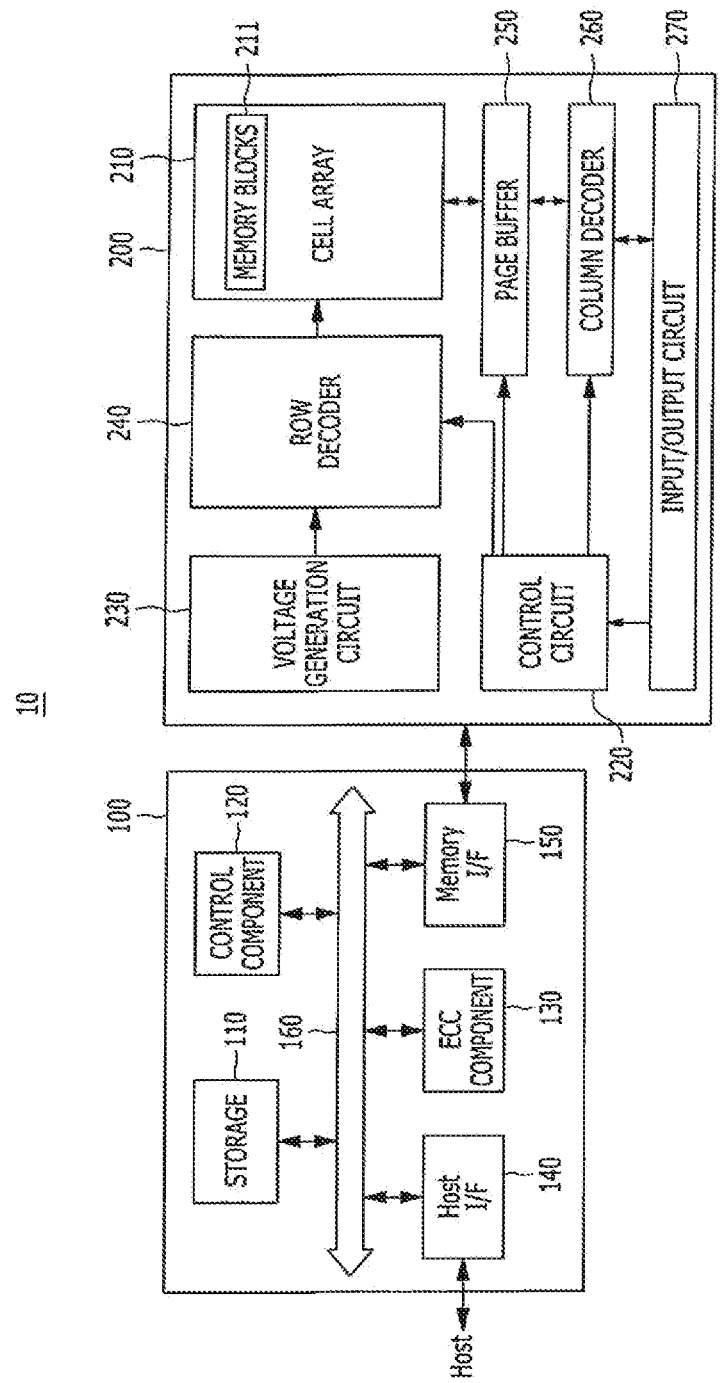
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., a request from host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as for example a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as for example a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and storage 110 may store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware or other program instructions, which can be referred to as a flash translation layer (FTL), to control operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during a read operation. In one embodiment, the ECC component 130 may not correct error bits when the number of the error bits is greater than or equal to a threshold number of correctable error bits, but instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices suitable for error correction operation.

The host interface 140 may communicate with the host device through one or more of various communication standards or interfaces such as for example a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. In one embodiment where the memory device 200 is a flash memory such as a NAND flash memory, the memory interface 150 may generate control signals for the memory and process data under the control of the control component 120.

The memory device 200 as shown for example in FIG. 2 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform program, read, or erase operations of the memory cell array 210. The control circuit 220 may control the peripheral circuit.

The voltage generation circuit 230 may generate operational voltages of various levels. For example, in an erase operation, the voltage generation circuit 230 may generate operational voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
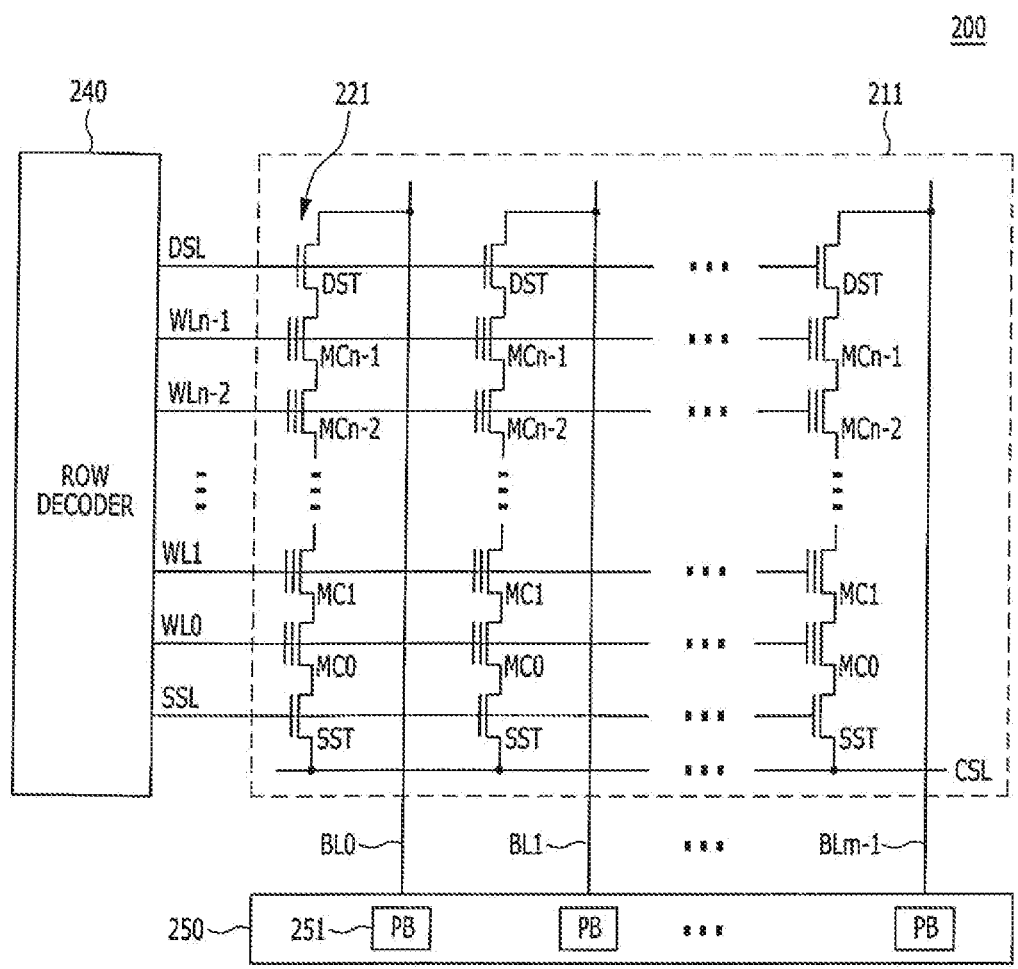
FIG. 3 is a circuit diagram illustrating a memory block of a memory device in accordance with still another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from the page buffer 250 or may transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device through the input/output circuit 270.

The control circuit 220 may control the peripheral circuit in response to the command and the address.

FIG. 3 is a circuit diagram illustrating a memory block of a semiconductor memory device in accordance with still another embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL, and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In various embodiments of the present invention, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
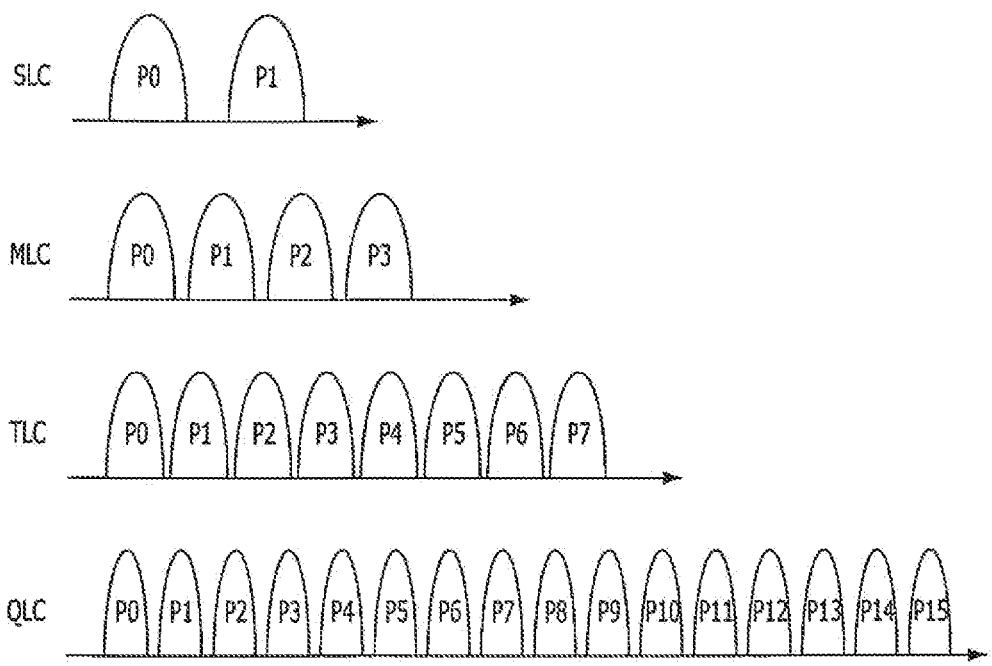
FIG. 4 is a diagram illustrating distributions of states for different types of cells of a memory device in accordance with one embodiment of the present invention.

FIG. 4 is a diagram illustrating distributions of states or program voltage (PV) levels for different types of cells of a memory device in accordance with one embodiment of the present invention.

Referring to FIG. 4, each of the memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed for example using a coding scheme (e.g., Gray coding) in order to increase the capacity of the memory system 10 such as SSD.

Figure 5:
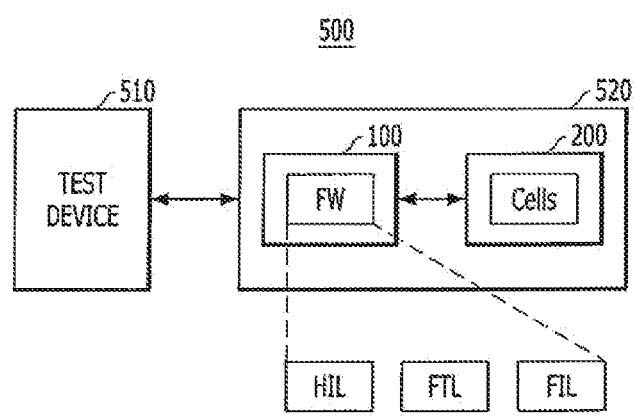
FIG. 5 is a diagram illustrating a test system in accordance with another embodiment of the present invention.

FIG. 5 is a diagram illustrating a test system 2 in accordance with another embodiment of the present invention.

Referring to FIG. 5, the test system 500 may include a test device 510 and a storage device 520. In various embodiments of the present invention, the test device 510 may be a real host device (e.g., the host device 5 of FIG. 1) or a virtual host device (i.e., a host simulator), which is communicatively coupled to the storage device 520.

The storage device 520 may include a controller 100 and a memory device 200. The memory device 200 may include a plurality of memory cells (e.g., NAND flash memory cells). The memory cells in memory device 200 are arranged in an array of rows and columns as shown in FIG. 3. The cells in a particular row are connected to a word line (e.g., WL0), while the cells in a particular column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line.

The controller 100 may include firmware (FW) or other program instructions which define a specific class of software for controlling various operations (e.g., read, write, and erase operations) for the memory device 200. In various embodiments of the present invention, the firmware may reside in the storage 110 and may be executed by the control component 120, in FIG. 2. The firmware may include a host interface layer (HIL) controlling communication with the test device 510, a flash translation layer (FTL) controlling communication between the test device 510 and the memory device 200, and a flash interface layer (FIL) controlling communication with the memory device 200.

The storage device 520 may be tested through various test approaches (e.g., black box, white box and unit tests). The storage device 520 for the test may be a hardware (HW) platform (i.e., a real storage device) or a simulator (i.e., a personal computer (PC)). Testing the storage device 520 may include sending, by the test device 510, some commands to the storage device 520 and checking the expected results.

In various embodiments of the present invention, the storage device 520 may be a solid state drive (SSD) implemented with a NAND flash device. A capacity of a NAND flash device is becoming so large that it takes too much time to create a precondition in a simulation environment using a scheme of merely running arbitrary IO workloads (i.e., commands). For example, it may take hours or days to write the entire capacity of the NAND flash device.

Alternatively, a precondition generation scheme may be used for the storage device 520. Generating and making a precondition for a test means turning the storage device 520 into specific predefined states. This precondition generation scheme may make the precondition creation time irrelevant to the precondition complexity. However, the firmware can be so complicated that it would be too difficult to support all data structures of firmware. Accordingly, embodiments of the present invention provide a scheme for effectively creating a precondition to be used for testing a storage device. In particular, embodiments of the present invention provide a test system for generating a test precondition for a storage device based on a factory-formatted state of a storage device.

Referring back to FIG. 5, the test device 510 may generate a test precondition for the storage device 520 and provide the generated test precondition to the storage device 520 such that the storage device 520 (e.g., the memory device 200) would be preconditioned based on the test precondition. Further, the test device 510 may run (perform) one or more tests on the preconditioned storage device 520. In particular, the test device 510 may generate a precondition based on a state after a factory format of the storage device 520 including data structures have been already dumped into the storage device 520. In one embodiment of the present invention, a precondition may be generated to be used in a simulation system (i.e., a NAND flash device simulator) and the entire preconditioning process may be performed on a virtual platform as described below.

Figure 6:
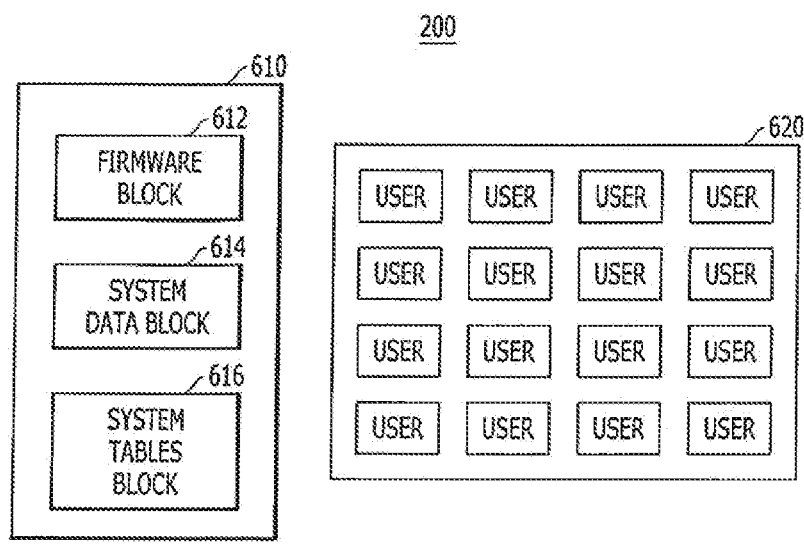
FIG. 6 is a diagram illustrating a memory device in accordance with still another embodiment of the present invention.

FIG. 6 is a diagram illustrating a memory device 200 of a storage device 520 in accordance with still another embodiment of the present invention.

Referring to FIG. 6, the memory device 200 may include a plurality of system blocks 610 and a plurality of user data blocks 620. The plurality of user data blocks 620 may include blocks for storing user data (e.g., write data). The plurality of system blocks 610 may include one or more firmware blocks 612, one or more system data blocks 614 for storing system data, and one or more system-tables blocks 616 for storing system tables.

Figure 7:
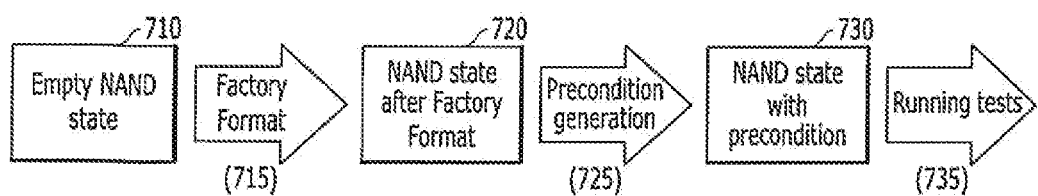
FIG. 7 is a diagram illustrating preconditioning and testing processes for a storage device in accordance with yet another embodiment of the present invention.

FIG. 7 is a diagram illustrating preconditioning and testing processes for a storage device 520 in accordance with yet another embodiment of the present invention.

Referring to FIG. 7, the preconditioning and testing processes may be performed on the storage device 520 (e.g., a NAND flash device). These processes may be performed by the test device 510. In one embodiment of the present invention, the test device 510 may be a real host device or a virtual host device.

First, the NAND flash device 520 may have an empty state (710). Second, a factory format procedure may be executed over the NAND flash device 520 with the empty state (715). This factory format procedure may happen in factory conditions before the NAND flash device 520 comes to the user. A particular FW code may be used for a factory format. The same FW code for the factory format may be used on the simulator platform as it is used for the same purposes on the hardware platform.

As a result of the factory format procedure, an initial snapshot (i.e., version) of system data structures (hereafter referred to as initial system data snapshot) may appear in the NAND flash device 520 (720) and thus the state of the NAND flash device 520 may be altered. For example, the state of the NAND flash device 520 after the factory format procedure is illustrated in snapshot 810 of FIG. 8. In the illustrated example, user data blocks may be still empty.

The test device 510 may obtain the initial system data snapshot. In various embodiments of the present invention, the initial system data snapshot may be obtained in the simulation environment using the original FW code for the factory format procedure. Alternatively, the initial system data snapshot may be obtained from the hardware platform. In this embodiment with the initial system data snapshot obtained from the hardware platform, the test device 510 may include special means to get NAND contents (i.e., the initial system data snapshot) from a real NAND flash device 520. For example, vendor-unique commands (VUC) may be used to extract NAND contents from the NAND flash device 520 (e.g., SSD) to the test device 510.

The test device 510 may generate a test precondition based on the initial system data snapshot (725) and provide the generated test precondition to the NAND flash device 520. The storage device 520 may be preconditioned based on the test precondition (730). For example, the state of the preconditioned NAND flash device 520 is illustrated in snapshot 820 of FIG. 8. The test device 510 may run one or more tests (e.g., black box, white box and unit tests) on the preconditioned storage device 520 (735).

Figure 8:
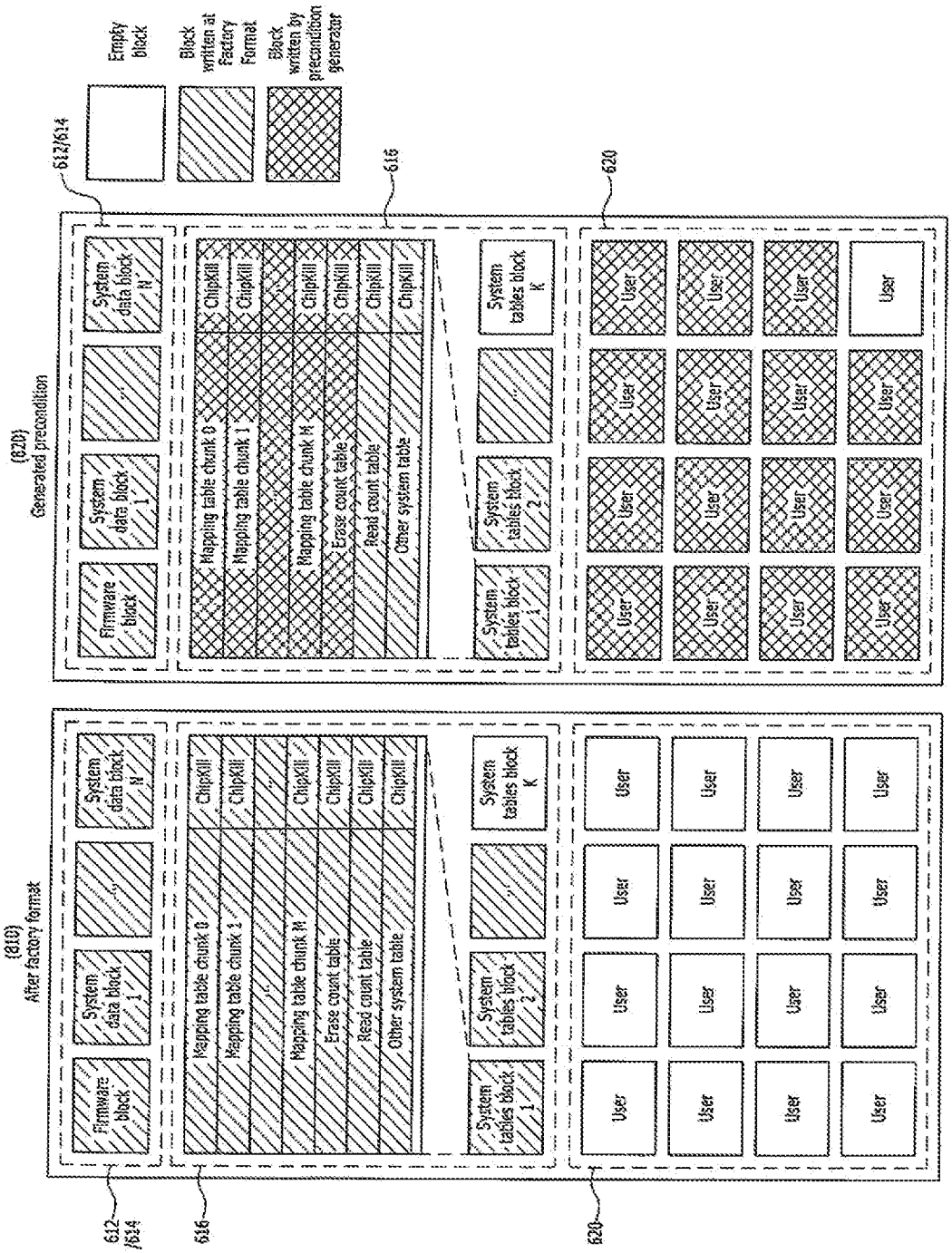
FIG. 8 is a diagram illustrating an example of generating a test precondition for a storage device in accordance with one embodiment of the present invention.

FIG. 8 is a diagram illustrating an example of generating a test precondition for a storage device 520 in accordance with one embodiment of the present invention.

In FIG. 8, 810 represents a state (or snapshot) of the storage device (e.g., a NAND flash device) 520 after a factory format procedure. In the illustrated example, firmware block 612, system data blocks 614, and system-tables blocks 616 of the storage device 520 may be written to have particular default settings through the factory format procedure (715). The system data blocks 614 may include N system data blocks. The system-tables blocks 616 may include K system-tables blocks. Each system-tables block may include (M+1) mapping table chunks, an erase counts table, a read counts table and other system tables. The mapping table chunks may be an address mapping table storing a mapping relationship between a logical block address (LBA) and a physical block address (PBA). LBA may be an address associated with a particular operation (e.g., a write operation) on the memory device 200, which is received from the host device 5 of FIG. 1 or the test device 510 of FIG. 5. PBA may be an address indicating a particular memory region (e.g., a page) of the user data blocks 620 in the memory device 200.

820 in FIG. 8 represents a state (or snapshot) of the storage device 520 after a precondition generation (725). In the illustrated example, some of the system-tables blocks 616 and some of the user data blocks 620 of the storage device 520 may be preconditioned to have a particular state as shown in 820. In the first system-tables block, (M+1) mapping table chunks, and an erase counts table may be preconditioned. As shown in FIG. 8, state 820 shows that 15 user data blocks of the user data blocks 620 are preconditioned.

Figure 9:
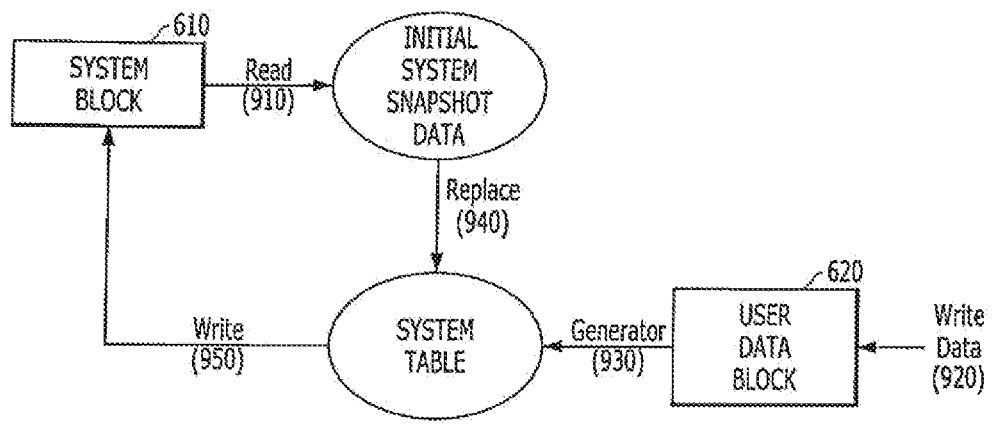
FIG. 9 is a diagram illustrating an operation of generating test precondition for a storage device in accordance with another embodiment of the present invention.

FIG. 9 is a diagram illustrating an operation of generating a test precondition for a storage device 520 in accordance with another embodiment of the present invention. The operation of FIG. 9 may be performed by the test device 510 of FIG. 5.

Referring to FIG. 9, the test device 510 may generate a test precondition for one or more of the system-tables blocks of the system block as shown in FIG. 8. When user data is in user data blocks, system tables may be written to the storage device 520. As the initial snapshot of system tables is already in the storage device 520 as shown in 810 of FIG. 8, the test device 510 may update system tables according to a read-modify-write procedure. The read-modify-write procedure may be applied to system data only because user data is written to empty (erased) user data blocks. The read-modify-write procedure is described as following.

At 910 in FIG. 9, the test device 510 may read the entire system blocks from a system block 610 to get an initial system data snapshot. In one embodiment of the present invention, the test device 510 may obtain the initial system data snapshot from either a PC (if the simulation environment is used) or a hardware platform (if a real NAND flash device is used). The read system blocks (i.e., initial system data snapshot) may be stored to a memory (e.g., a random access memory (RAM)).

Then, the test device 510 may allocate system tables in the memory. In various embodiments of the present invention, the test device 510 may allocate an address mapping table, an erase counts table and a read counts table. Further, the test device 510 may erase system blocks and user data blocks.

At 920 in FIG. 9, the test device 510 may write data to one or more user data blocks 620 selected from among the user data blocks based on a set precondition type such that the storage device 520 is preconditioned. Based on the desired precondition type (or data writing precondition), logical block addresses (LBAs) may be spread among user data blocks. In various embodiments of the present invention, the set precondition type may include a sequential precondition for a sequentially written storage device, a random precondition for a randomly written storage device, and a sustained precondition for a storage device in a sustained state. The sustained state means that the entire capacity of the storage device 520 has been written so many times that write amplification index (WAI) became stable without big varying. After LBAs have been spread among user data blocks, system tables such as an address mapping table and other system tables may be filled.

In one embodiment, for the sequential precondition, the test device 510 may write the user data blocks 620 with sequentially increasing LBAs. That is, the test device 520 may sequentially write data to the user data blocks 620, which are sequentially selected based on the sequential precondition. In another embodiment, for the random/sustained precondition, the test device 510 may write the user data blocks 620 with random LBAs and write some invalid data. That is, the test device 520 may randomly write data to the user data blocks 620, which are randomly selected based on the random/sustained precondition. For the random/sustained precondition, all valid data in the user data blocks may be at its beginning part of the user data blocks, and all invalid data may be at the end part of the user data blocks such that garbage collection (GC) is not influenced. In some embodiments, for the random/sustained precondition, each user block may be written not to have 100% full of valid pages. For example, each user block may be written to have 90% valid data and 10% invalid (dummy) data. Alternatively, valid and invalid data may be evenly mixed within the user data blocks.

Figure 10:
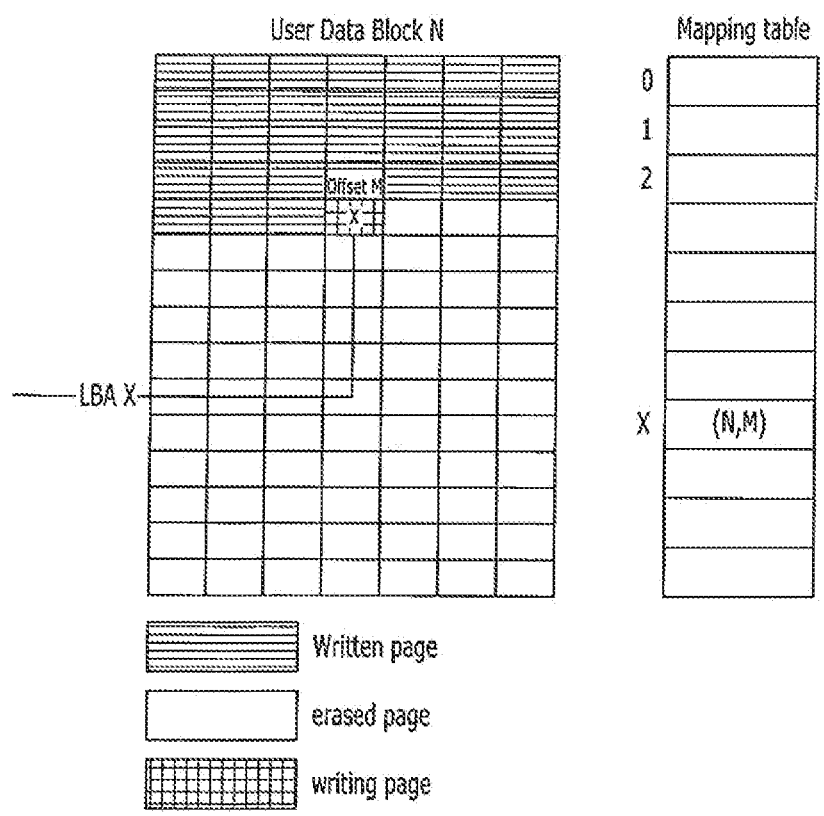
FIG. 10 is a diagram illustrating an example of an operation of updating an address mapping table for a storage device in accordance with still another embodiment of the present invention.

At 930 in FIG. 9, the test device 510 may generate one or more system tables associated with the erasing and writing of the user data blocks. In one embodiment, the test device 510 may generate an address mapping table. As shown in FIG. 10, after a user data block N is written to a particular page (e.g., a physical address (N, M)) associated with a particular logical block address (e.g., LBA X), mapping information between the logical address and the physical address may be stored (updated) in the address mapping table. In another embodiment, the test device 510 may generate a chipkill parity associated with encoding of each mapping table chunk. For example, the chipkill parity may be generated by performing an exclusive OR (XOR) calculation on bits of each mapping table chunk. For another example, when write data has a regular structure for the sequential precondition, the address mapping table may be generated without XOR calculation. In another embodiment, the test device 510 may generate an erase counts table associated with the erasing of the user data blocks.

At 940 in FIG. 9, the test device 510 may replace the obtained system tables (i.e., initial system data snapshot) with the generated system tables in the memory. That is, the initial system data snapshot may be modified. In one embodiment, the initial erase counts snapshot may be replaced by the generated erased counts table data. For the sequential/random precondition, erase counters for all written user data blocks may be set to a particular value (e.g., "1"). For the sustained precondition, erase counters for all written user data blocks may be set to a predefined value depending on overprovisioning (OP) or any other (arbitrary) values. In another embodiment, the initial mapping table snapshot may be replaced by the generated mapping table data. As noted above, chipkill parity for the mapping table data may be generated.

At 950 in FIG. 9, the test device 510 may write the modified system tables (i.e., initial system data snapshot) to the system block 610.

The read-modify-write procedure above may be performed for one FTL. If there are multiple FTL instances, operations 920 to 950 may be repeatedly performed for each FTL. After the read-modify-write procedure above is performed, the test device 510 may run one or more tests using the generated precondition.

Experiments were conducted to measure performance of the described precondition generation scheme in accordance with embodiments of the present invention and a straightforward scheme (without using the precondition generation scheme). 1 TB 3D TLC 8CH SSD simulator was used for experiments. The results show that the precondition generation scheme of the present invention can improve precondition generation time in comparison to the straightforward scheme, which is indicated in LIST1 below.

| Precondition Type | Straightforward Scheme | Precondition Scheme |
|---|---|---|
| Sequential (large chunks) | 3 hours | 2 minutes |
| Random (small chunks) | 37 hours | 3 minutes |
| Sustained (small chunks) | Does not complete in 1 week | 3 minutes |

LIST1:

As described above, embodiments of the present invention provide a scheme for generating test precondition based on factory-formatted state of a data storage device. This scheme may reduce generation time of a test precondition to be used for testing the data storage device.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention embraces all modifications and alternatives. Furthermore, the embodiments may be combined to form additional embodiments.

What is claimed is:

1. A test system comprising:
   a storage device including a plurality of system blocks and a plurality of user data blocks, the system blocks configured to store an initial system data snapshot; and
   a test device communicatively coupled to the storage device and configured to:
      read the initial system data snapshot from the system blocks of the storage device, in which the initial system data snapshot is stored and represents a factory format of the storage device;
      erase the system blocks and the user data blocks;
      write data to one or more user data blocks selected from among the user data blocks based on a set precondition such that the storage device is preconditioned;
      generate one or more system tables associated with the erasing and writing of the selected user data blocks;
      replace the initial system data snapshot with the system tables associated with the erasing and writing of the selected user data blocks;
      write the replaced system tables to the system blocks; and
      perform one or more tests on the preconditioned storage device to determine if errors exist at least in writing the data to the storage device.

2. The test system of claim 1, wherein the initial system data snapshot includes factory default settings stored in the storage device through the factory format.

3. The test system of claim 1, wherein the initial system data snapshot includes at least one of an initial address mapping table snapshot and an initial erase counts table snapshot.

4. The test system of claim 3, wherein the system tables include an address mapping table for storing a mapping relationship between one or more logical block addresses and one or more physical block addresses of data blocks associated with the writing of the user data blocks and an erase counts table storing erase counts of the user data blocks according to the erasing of the user data blocks.

5. The test system of claim 1, wherein the set precondition includes one of a sequential precondition, a random precondition and a sustained precondition.

6. The test system of claim 5, wherein the test device is configured to sequentially write the data to user data blocks, which are sequentially selected based on the sequential precondition.

7. The test system of claim 5, wherein the test device is configured to randomly write the data to user data blocks, which are randomly selected based on the random precondition.

8. The test system of claim 5, wherein the test device is configured to write valid data to user data blocks at a set beginning part among the plurality of the user data blocks and write invalid data to user data blocks at a set end part among the plurality of the user data blocks, the beginning and end parts being selected based on the random and sustained precondition, or the test device is configured to write valid data of a first percentage and write invalid data of a second percentage to each user data block based on the random and sustained precondition, the first percentage greater than the second percentage.

9. The test system of claim 1, wherein the test device replaces the initial system data snapshot with the system tables by:
   storing the read initial system data snapshot in a memory; and
   replacing the stored initial system data snapshot with the system tables.

10. A method for testing a storage device including a plurality of system blocks and a plurality of user data blocks, the system blocks storing an initial system data snapshot, the method comprising:
   reading the initial system data snapshot from the system blocks of the storage device, in which the initial system data snapshot is stored and represents a factory format of the storage device;
   erasing the system blocks and the user data blocks;
   writing data to one or more user data blocks selected from among the user data blocks based on a set precondition such that the storage device is preconditioned;
   generating one or more system tables associated with the erasing and writing of the selected user data blocks;
   replacing the initial system data snapshot with the system tables associated with the erasing and writing of the selected user data blocks;
   writing the replaced system tables to the system blocks; and
   performing one or more tests on the preconditioned storage device to determine if errors exist at least in writing the data to the storage device.

11. The method of claim 10, wherein the initial system data snapshot includes factory default settings stored in the storage device through the factory format.

12. The method of claim 10, wherein the initial system data snapshot includes at least one of an initial address mapping table snapshot and an initial erase counts table snapshot.

13. The method of claim 12, wherein the system tables include an address mapping table for storing a mapping relationship between one or more logical block addresses and one or more physical block addresses of data blocks associated with the writing of the user data blocks and an erase counts table storing erase counts of the user data blocks according to the erasing of the user data blocks.

14. The method of claim 10, wherein the set precondition includes one of a sequential precondition, a random precondition and a sustained precondition.

15. The method of claim 14, wherein the writing data to one or more user data blocks includes sequentially writing the data to user data blocks, which are sequentially selected based on the sequential precondition.

16. The method of claim 14, wherein the writing data to one or more user data blocks includes randomly writing the data to user data blocks, which are randomly selected based on the random precondition.

17. The method of claim 14, wherein the writing data to one or more user data blocks includes writing valid data to user data blocks at a set beginning part among the plurality of the user data blocks and write invalid data to user data blocks at a set end part among the plurality of the user data blocks, the beginning and end parts being selected based on the random and sustained precondition, or the writing data to one or more user data blocks includes writing valid data of a first percentage and invalid data of a second percentage are written to each user data block based on the random and sustained precondition, the first percentage greater than the second percentage.

18. The method of claim 10, wherein the replacing the initial system data snapshot with the system tables includes:
storing the read initial system data snapshot in a memory; and
replacing the stored initial system data snapshot with the system tables.

19. A method for testing a storage device having a plurality of system blocks and a plurality of user data blocks, the method comprising:
generating an initial system data snapshot showing states of the system blocks and the user data blocks based on factory default settings;
erasing the system blocks and the user data blocks;
preconditioning the storage device by writing data to one or more user data blocks of the storage device using a data writing precondition which spreads logical block addresses among different user data blocks; and
performing one or more tests on the preconditioned storage device to determine if errors exist at least in writing the data to the storage device.

20. The method of claim 19, wherein the data writing precondition includes one of a sequential precondition, a random precondition and a sustained precondition.

* * * * *